United States Patent

[11] 3,596,508

[72] Inventor Graham W. Howard
 5996 S. Crocker St., Littleton, Colo. 80120
[21] Appl. No. 882,166
[22] Filed Dec. 4, 1969
[45] Patented Aug. 3, 1971

[54] BELT TENSION MENSURATION DEVICE
 11 Claims, 5 Drawing Figs.
[52] U.S. Cl. ................................................. 73/144
[51] Int. Cl. ............................................. G01l 5/06
[50] Field of Search .......................................... 73/144

[56] References Cited
 UNITED STATES PATENTS
 3,171,278 3/1965 Howard, Jr. ............... 73/144
 3,482,442 12/1969 Howard ..................... 73/144

FOREIGN PATENTS
150,839 9/1920 Great Britain .............. 73/144

Primary Examiner—Charles A. Ruehl
Attorney—Richard D. Law

ABSTRACT: A tension measuring device particularly for automotive drive belts includes a body having a belt contact point, a lever pivotally mounted from one end of the body extends to a holding position providing a second belt contact point, and a second lever pivotally mounted from about the holding position extends to the opposite end thereof forming a third contact belt point. A predetermined pressure indicating means associated with the first lever indicates when a predetermined pressure is applied to the unit by the user while the unit is seated on a belt, and movement of the second lever on a scale indicates tension on the belt.

PATENTED AUG 3 1971
3,596,508
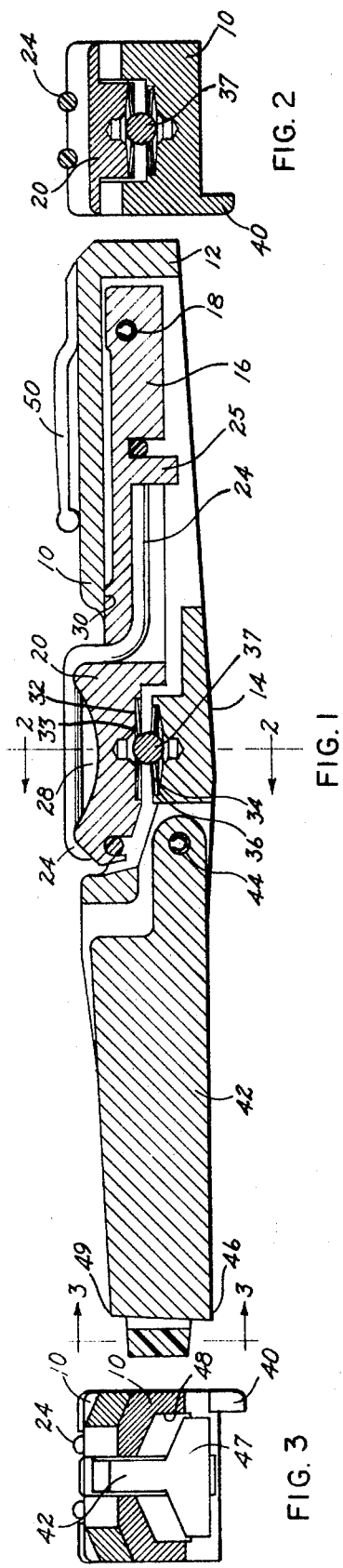
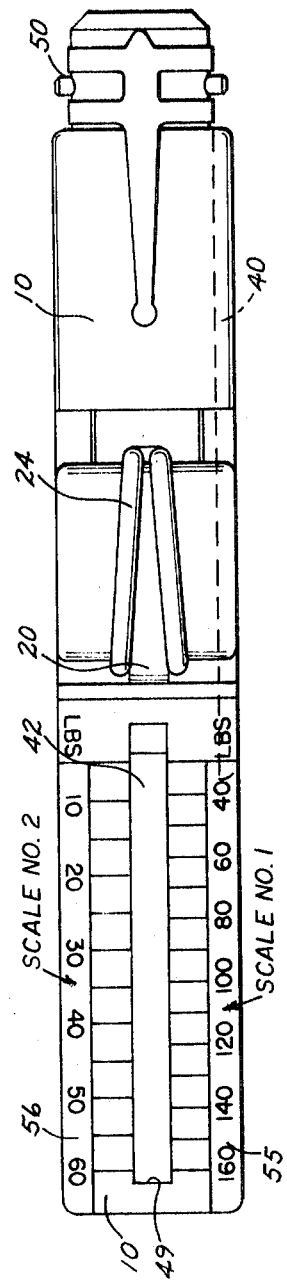
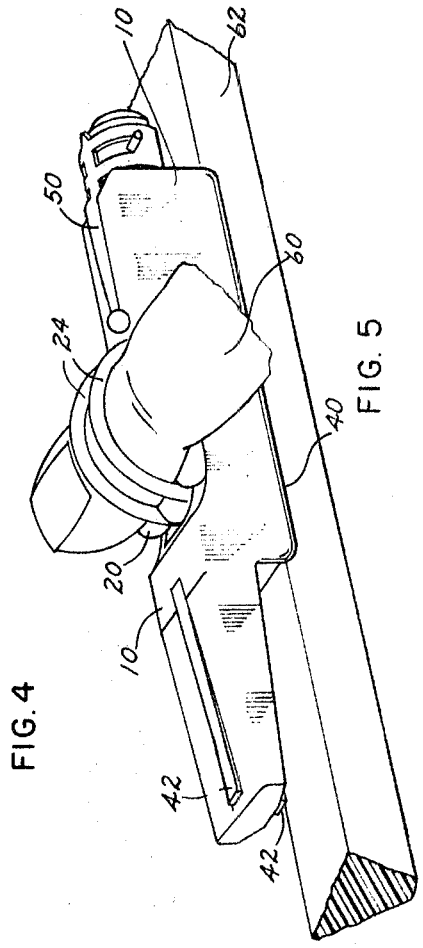
INVENTOR.
GRAHAM W. HOWARD
BY
Richard H. Law
ATTORNEY

BELT TENSION MENSURATION DEVICE

A drive belt normally transmits rotary motion from one sheave member to another sheave member. For efficient use, the belt must be under proper tension which is sufficient to carry the load between the two sheaves without slippage between the belt and the sheaves. When a belt is too loose, the efficiency of the drive is decreased and increased wear on the belt and the sheaves is the result. When a drive belt is too tight, it places undue stress on the bearings of the shafts for the sheaves, and the strain on the belt itself substantially decreases its life. An accepted procedure for determining tension on a belt is to exert a measurable force on a belt directed perpendicularly to the belt surface at about the center of the span between the two sheaves. This force depresses the belt an amount that may be measured. Two different unit systems are utilized in defining the tension. In one unit, called the English mensuration system, the deflection of the belt is one sixty-fourth of an inch per inch of span, and in the other, called the Metric system, it is 1 millimeter of depression per 100 millimeters of span. The force necessary to deflect the belt these distances is a function of the tension of the belt. The ratio of the force [F] divided by the tension [T] or F/T for the true force diagram is one-sixteenth for the English system and is one twenty-fifth for the Metric system.

Belt drives for automotive applications are generally narrow belts, usually of the V type. Further, the span between sheaves is not large. However, in most cases where the tension of the belt is being tested, the span to be tested may be difficulty accessible and generally is dark. In a great many instances, the automotive belts will be tested by service station operators under poor lighting conditions. In most instances, the operation of an automobile engine is not so precise that absolute accuracy in belt tension is necessary. It is generally sufficient that the tension on automotive belts be approximately correct. Therefore, under most service conditions of automobile belts, a number of factors necessary to accurately determine the tension on the belt may be essentially disregarded, for example the length of span, the type of belt, etc. By assuming that automotive belts operate at one of several tensions, optimum life may be achieved for all the tested automotive belts.

It is, therefore, included among the objects and advantages of the present invention to provide a mensuration device for determining the tension on an automotive drive belt.

Another object of the invention is to provide a simple belt tester which is held or secured to the finger of the user and permits the user to measure tension on a belt by feel alone.

Another object of the invention is to provide a small highly useful belt tension tester which provides a sufficiently accurate approximation of the tension on automotive belts to insure optimum wear life of all common automotive drive belts.

These and other objects and advantages of the invention may be readily ascertained by referring to the following description and appended illustrations in which:

FIG. 1 is a cross-sectional, side elevational view of a belt tension testing device according to the invention;

FIG. 2 is an end elevational view of the device of FIG. 1 taken along section line 2-2;

FIG. 3 is an end elevational view of the tester of FIG. 1;

FIG. 4 is a top plan view of the belt tension tester of FIG. 1; and

FIG. 5 is a perspective view illustrating the use of the belt tension tester of the invention.

In the device illustrated, a hollow body 10 provides a belt contact point 12 at one end and a belt contact point 14 generally centrally thereof. Mounted in the body 10 is a first lever mechanism 16, pivotally secured by a pivot pin 18 to the body 10 at a point adjacent the belt contact point 12, and providing a user's pressure platform 20 positioned centrally of the body. A rubber band or O-ring 24 is looped over the pressure platform 20 and around a projection 25 on the lever 16 to provide support for the finger area 28 on the pressure platform 20. The lever is provided with a contact point 30 which is arranged to bear against the upper part of the body 10 to limit upward movement of the lever about the pivot point 18. A single special Bellville washer 32 is mounted in a recess 33 in the lever 16 and a double or heavier single special Bellville washer 34 is mounted in a recess 36 in the body 10 above the belt contact point 14. The curvature of washers are reversed, so that downward pressure is exerted on the convex side of each set of washers. A ball bearing 37 is mounted between the two sets of washers resting in their center apertures. A projection 40 extends below the body 10 providing an abutting means serving as a guide on a side of a belt, providing accurate positioning of the tester on the belt. A second lever 42, pivotally mounted about pivot pin 44, is mounted at the end of the body opposite from the first lever. Lever 42 provides a belt contact point 46 at its outermost end, thereby providing the three points for belt contact. The outer end of the lever 42 has an expanded end 47 fitting in a cavity 48 in the outer end of the body 10. This provides belt contact with very narrow belts and prevents movement of the lever upwardly beyond the cavity. Downward movement of the lever 42 out of its slot in the body is prevented by the upper corner 49 of the lever contacting the outer end of the body 10, illustrated in FIG. 1. A friction fit of the lever in slot permits the lever to be moved quite freely by pressure, but holds it in place in the absence of any pressure.

A pocket clip 50, mounted on the outer end of the body, provides a carrying for the device in the pocket of the user. The small size of the unit permits easy shirt pocket carrying.

Along each side of the second lever 42 on the sloped sections 55 and 56 are a pair of scales corresponding to the first and second indication of the amount of force applied to the belt. On the side 55, labeled scale No. 1, the belt tension is indicated from 10 to 60 pounds, and on the other side 56, labeled scale No. 2, the indication runs from 40 to 160 pounds. This configuration is for the English system which is measured in pounds. For the metric system, the scales may be adjusted to the metric deflection and tension indicated in kilograms. In each case, the scale is made to conform with the belt depression angle of the system shown by the angle at which the second lever is moved on depressing the pressure platform to the first or second pressure level. The range of these scales may be changed for different uses, if necessary. Also, for automotive work, it is practical to consider use of only a 40—160 pound scale (sometimes heavier than 160 pounds) such as shown in the drawings.

In use, a user may place one of his fingers 60 under the rubber band 24 on the pressure platform 20, so that the device is mounted on the user's finger extending laterally of the axis of the finger. The unit is then placed on the belt 62 with the projection or guide 40 against the side of the belt. Prior to placing the tester on a belt, the lever 42 is pushed down into the body 10 the full distance so that it extends below the lower part of the body 10. With the tester in position on the belt, the user then pushes down on the platform 20 with his finger, which forces the upper special Bellville washer 32 bearing upon the ball 37 to reverse its curve, and at a predetermined pressure, about 2¾ pounds, the special Bellville washer arc is suddenly reversed making a snapping sound, which is both heard and felt by the user. At this particular pressure, a certain belt depression is produced and the lever 42 has been retracted into the body a certain amount since the belt is depressed into a double angle from the center contact point which forces the lever 42 upwardly. The intersection of the lever 42 with the scale is then determined, and at that point the scale reads directly (in pounds) the tension on the belt. Where the belt is under a greater tension that the maximum of scale 1, the lever 42 is pushed back down and the tester replaced on the belt. Pressure is applied until the double or heavier single special Bellville washer 34 clicks (when about double the pressure when applied or in this case about 6 pounds) after the first one reverses. When the 6-pound level of force on the platform 20 is reached the double Bellville washer reverses, snaps and the sound and click is felt by the user. This, of course, has depressed the belt 62 further, raising the lever 42 still further into the body and the tension on the belt may be read on scale No. 2 where the lever intersects the scale. The top of the lever is formed at an angle which is a function of the angle of depression of the belt.

When pressure is applied on the platform 20 there is about a 0.022-inch depression of the platform toward the ball to cause the Bellville washer to reverse and snap. An additional depression of 0.022 inch causes the double Bellville washer to reverse and it snaps. The angle of depression of the belt under the predetermined force is a function of the tension on the belt. A loose belt produces a greater angle of depression and the higher the lever 42 is raised in the body. The expanded end 47 on the lever 42 provides a means for contacting both very narrow and wider than usual belts when the tester guide 40 is pushed up against the belt.

Under some circumstances a phenomenon occurs which is known as locked centers. This is where the belt pulleys stop and are held against turning in the absence of the motivating power on the drive pulley. This may induce a difference of tension on the different spans of the belt. Thus, the drive pulley may be held tightly stopped by the engine and the accessory pulleys held tightly stopped by the engine and the accessory pulleys held tightly stopped by the accessory (pump, air conditioner compressor, alternator, or the like) cause the spans of the belt to have unequal tension as the belt normally does not slip on the pulleys. This condition is readily alleviated by pressing a few times on one span, or the tension may be measured on each span and the average determined for all the spans.

The special Bellville washers are excellent springs for the purpose, and by using the recess against the convex side of the washer a built-in stop is provided to prevent damage to the washer. This safety factor is important since the washers must not be reversed too far or they will not return to original configuration. The use of a pair of the special Bellville washers is not as satisfactory as a single heavier one since hysteresis may be caused due to the friction caused by movement of the paired singles.

One important feature of the unit is its configuration which places the force exerted by a finger a very short distance above the belt. This reduces the chance of tilting the tester and exerting the force at an angle in relation to the longitudinal axis through the belt. This provides a very accurate application of a perpendicular force on the belt. In some cases the pressure platform may be grasped by a finger and a thumb, holding the same instead of using the rubber band. The pressure, also, is easily applied perpendicularly to the belt with this method of holding.

This tester also bends the belt only once, which tends to make it more accurate than some testers which bend the belt two or more times in making the tension test. It takes energy to bend the belt. Therefore the least number of times belt has to be bent makes for the greater accuracy in tension readings.

I claim:

1. Belt drive tension mensuration device comprising an elongated body having a first belt contact point adjacent one end and a second belt contact point about centerwise thereof; first lever mean pivotally mounted adjacent said first belt contact point and providing a pressure platform generally centerwise of said body; pressure indicating means mounted between said pressure platform and said body providing indication of at least one pressure amount applied on said pressure platform, and said applied pressure simultaneously depresses a belt on which the device is resting; second lever means pivotally mounted generally centerwise of said body, and extending away from the end of said body adjacent said first belt contact means; said second lever means providing a movable third belt contact point adjacent its end remote from said pivotal mounting; and scale means cooperative between said body and second lever for measuring the depression angle of said belt and indicating tension on said belt.

2. Belt drive tension mensuration device according to claim 1 wherein said body is generally hollow, and said first and second levers are partially mounted internally of said body.

3. Belt drive tension mensuration device according to claim 1 wherein said body is relatively thin and said pressure platform is positioned a relatively short distance above the surface of the belt on which it rests.

4. Belt drive tension mensuration device according to claim 1 wherein said second lever means is frictionally held against free movement, and is movable by a user and a belt when pressure is applied on said pressure platform.

5. Belt drive tension mensuration device according to claim 1 wherein said first and second belt contact points are connected by a planar areas, contacting a belt between said contact points.

6. Belt drive tension mensuration device according to claim 1 wherein said scale means includes at least one scale on said body and the position of said second lever in relation to said body is determined on said scale.

7. Belt drive tension mensuration device according to claim 1 wherein said pressure indicating means indicates two pressure amounts, one being greater than the other, and said scale means including two separate scales, one scale indicating belt tension on application of the first pressure amount and the other scale indicating belt tension on application of the second pressure amount.

8. Belt drive tension mensuration device according to claim 7 wherein said pressure indicating means includes two sets of opposed special Bellville washers with a ball therebetween, the first of said sets being at least a single washer arranged to reverse its curvature at a predetermined pressure and the other set being at least one special Bellville washer heavier than said first arranged to reverse its curvature at about twice the predetermined pressure of said first.

9. Belt drive tension mensuration device according to claim 1 wherein said pressure indicating means includes at least one special Bellville washer arranged to reverse its curvature on pressure being applied to said pressure platform to indicate by a click when a predetermined amount of pressure is applied to said pressure platform.

10. Belt drive tension mensuration device according to claim 1 wherein said second lever includes a widened tip opposite its pivotal mounting to contact narrow belts.

11. Belt drive tension mensuration device according to claim 1 wherein said body includes a belt guide at one side for positioning said device against the side of a belt on which it is resting.